RYUZO UENO AND
TETSUYA MIYAZAKI
INVENTORS

3,816,521
PROCESS FOR THE PRODUCTION OF p-HYDROXY BENZOIC ACID
Ryuzo Ueno, Nishinomiya-shi, and Tetsuya Niyazaki, Itami-shi, Japan, assignors to Ueno Pharmaceutical Co., Ltd., Osaka, Japan
Filed Mar. 25, 1968, Ser. No. 715,881
Claims priority, application Japan, Oct. 2, 1967, 42/63,018; Nov. 8, 1967, 42/71,391; Jan. 17, 1968, 43/2,151; Jan. 18, 1968, 43/2,342; Feb. 5, 1968, 43/6,688
Int. Cl. C07c 65/04
U.S. Cl. 260—521 R                13 Claims

ABSTRACT OF THE DISCLOSURE

A process for the production of p-hydroxy benzoic acid which comprises suspending a reactant selected from the group consisting of potassium phenoxide and mixtures of potassium phenoxide with phenol, in a liquid hydrocarbon boiling at 180°–350° C. selected from the group consisting of kerosene, light oil and mixtures thereof, and contacting the suspension with carbon dioxide of a pressure not exceeding 30 kg./cm.$^2$, at a temperature not lower than 180° C.

---

The present invention relates to the production of p-hydroxy benzoic acid, particularly the production thereof from potassium phenoxide and carbon dioxide. More particularly, the invention relates to an improved process for the production of p-hydroxy benzoic acid in which potassium phenoxide is reacted with carbon dioxide in the presence of a reaction medium.

Among the conventional preparation processes of p-hydroxy benzoic acid, that which comprises subjecting carbon dioxide to react with potassium phenoxide powder at elevated temperatures and under superatmospheric pressures to form potassium salts of p-hydroxy benzoic acid, and then precipitating the object p-hydroxy benzoic acid by addition of hydrochloric acid, sulfuric acid, etc., in accordance with the accepted practice, has been considered the most economical and practicable. The same process utilizes the mechanism known as Kolbe-Schmitt reaction and, for example, p-hydroxy benzoic acid yield based on the starting potassium phenoxide is, at the best, approximately 60%. However, the process is open to such objections as that the reaction requires a long period, e.g., four hours, because it is performed in a heterogeneous system of solid-gaseous phases; that the reaction is extremely exothermic and the controlling of the temperature is difficult; and also that, because of the high temperature, loss of phenol is great. Furthermore, molten reaction material occasionally solidifies and adheres onto the reactor wall, etc. to lower the thermal conductivity of the apparatus. For example, British Patent No. 942,418 discloses a process in which the reaction is performed under the circulation of an inert gas, in order to regulate the reaction conditions such as the reaction heat. Still in addition, under certain conditions the reaction tends to cause the side-formation of salicylic acid in large quantities, thereby lowering the yield of p-hydroxy benzoic acid. Due to those disadvantages the process is unsuitable for continuous operation, and in this respect also is unsatisfactory for economical mass production.

As attempts to solve these difficulties, liquid- or suspension-phase reaction of potassium phenoxide with carbon dioxide employing a reaction medium was experimented. For example, such media as aliphatic higher alcohols, pyridine and ketones were tested. However with such media the progress of reaction was unsatisfactory, and the selectivity for p-hydroxy benzoic acid was poor. Furthermore, these media are unfavorable from economical standpoint. Diphenyl ether and the like gave relatively favorable results, but they are costly, and the reaction employing them as the media still consumes 90–120 minutes, with p-hydroxy benzoic acid yield based on potassium phenoxide of no more than 50%. In another attempt alkali phenolate was dissolved in phenol and reacted with carbon dioxide. However according to that process the reaction rate was markedly reduced, and consequently carbon dioxide had to be used under an extremely high pressure. Furthermore the reaction product consisted chiefly of salicylic acid. Thus the process is unsuitable for the preparation of p-hydroxy benzoic acid. Incidentally, it has been reported, concerning the phenol which is by-produced in the reaction of potassium phenoxide with carbon dioxide, that its presence lowers the yield of p-hydroxy benzoic acid and increases the salicylic acid yield. Furthermore, use of an aromatic hydrocarbon or aromatic ether boiling at a temperature not lower than 180° C. has been proposed as the solvent, but such a process was reported to exhibit low conversion of alkali phenolate (cf. Japanese Patent Application, Publication No. 1,617/66).

In the production of p-hydroxy benzoic acid by the reaction of potassium phenoxide with carbon dioxide, recovery and recycling of side-produced phenol is also one of the important problems. According to the conventional solid-gaseous phase reaction, the phenol is separated from the reaction product by evaporation, and converted to potassium phenoxide by a caustic potash treatment to be recycled into the reaction system. However, the recovery of phenol by evaporation is economically unsatisfactory because of low recovery ratio and thermal efficiency. Not only that, because unreacted potassium phenoxide does not evaporate but remains in the reaction product, the purity of the formed p-hydroxy benzoic acid or salt thereof is impaired.

Furthermore, the conventional processes are by no means satisfactory as to the recovery of expensive potassium source and yield of p-hydroxy benzoic acid based on the starting potassium phenoxide. That is, known recovery and recycling methods of potassium source include the following: a method comprising treating the reaction mixture with hydrochloric acid to form potassium chloride, electrolyzing the same and recovering the potassium in the form of hydroxide thereof, the hydroxide being re-used for the preparation of potassium phenoxide; method comprising treating the reaction mixture with sulfur dioxide to form potassium hydrogensulfite, reacting the same with calcium hydroxide, and recycling the so formed potassium hydroxide for the preparation of potassium phenoxide; and a method comprising treating potassium p-hydroxy benzoate with salicylic acid to form a potassium double salt of salicylic acid, hydrolyzing the same to separate potassium salicylate from p-hydroxy benzoic acid, adding to the former potassium hydroxide to form dipotassium salicylate, converting the same to dipotassium p-hydroxy benzoate by thermal rearrangement, and thus recycling the potassium source. However, foregoing methods have not been commercialized because they require special equipments and complicated treating steps for the potassium source recovery. For this reason, at present the p-hydroxy benzoic acid yield based on the starting potassium phenoxide cannot exceed approximately 60%.

Accordingly, therefore, the fundamental object of the invention is to provide a process for the selective production of p-hydroxy benzoic acid from potassium phenoxide and carbon dioxide, in high yield.

Another object of the invention is to provide a process in which the reaction of potassium phenoxide with carbon dioxide is completed within very short time, and the reaction conditions such as temperature can be easily controlled.

A further object of the invention is to provide a process in which the formation of salicylic acid in the reaction of potassium phenoxide with carbon dioxide is kept to the minimum, whereby improving the yield of p-hydroxy benzoic acid.

Still another object of the invention is to provide a process in which the phenol which is side-produced of the reaction of potassium phenoxide with carbon dioxide is recovered and recycled with high efficiency.

An additional object of the invention is to provide a process in which the expensive potassium source is recovered and recycled with high efficiency, whereby improving the p-hydroxy benzoic acid yield based on potassium phenoxide.

Still an additional object of the invention is to provide a process which enables the continuous preparation of p-hydroxy benzoic acid from potassium phenoxide and carbon dioxide, and thereby making the economic mass production possible.

Other objects and advantages of the invention will become apparent from the following descriptions.

According to the invention, these objects are accomplished by the process which comprises contacting potassium phenoxide, as suspended in a liquid hydrocarbon selected from the group consisting of kerosene, light oil, and mixtures thereof which are boiling at 180°–350° C., with carbon dioxide pressurized not higher than 30 kg./cm.$^2$, at temperatures not lower than 180° C.

As already stated, numbers of attempts to perform the reaction of potassium phenoxide with carbon dioxide in the presence of a liquid medium, such as aliphatic petroleum hydrocarbons, have been reported in the past, but none ever achieved a satisfactory result. Whereas, according to our researches, it is discovered that, when specific petroleum hydrocarbons boiling at 180°–350° C., such as kerosene, light oil and mixtures thereof, are used as the suspension media of potassium phenoxide, contact reaction of such suspensions with carbon dioxide produces p-hydroxy benzoic acid very advantageously, compared with any of the past attempts to perform the reaction in a reaction medium. To wit, according to the present process, not only the conversion of potassium phenoxide is excellent, but the formation ratio of p-isomer is exceedingly high. For example, formation of salicylic acid is not appreciable in the reaction performed at 230° C. and carbon dioxide pressure of 10 kg./cm.$^2$. Furthermore, side-production of 4 - hydroxy isophthalic acid is also negligible. Thus p-hydroxy benzoic acid can be obtained at high yield with high selectivity.

The unique result achieved by the use of specifically kerosene, light oil or a mixture thereof boiling at 180°–350° C. as the reaction medium may be understood from Tables 1 and 2 below. Table 1 shows the results of performing the reaction of potassium phenoxide with carbon dioxide in such liquid media as n-octyl alcohol, diphenyl ether, kerosene boiling at 180°–250° C. and fraction of gasoline distillate boiling at 100°–150° C., at carbon dioxide pressure of 5 kg./cm.$^2$ and 190° C., which is close to the lower limit of the reaction temperature, for an hour. Table 2 shows the results of similar reaction in the absence of medium, and also in such liquid media as diphenyl ether and light oil boiling at 200–310° C. at carbon dioxide pressure of 5 kg./cm.$^2$ and 230° C., which is closed to the upper limit of the reaction temperature, for an hour.

TABLE 1

| Potassium phenoxide (g.) | Medium, g. | p-Hydroxy benzoic acid (g.) | Salicylic acid (g.) | Total of hydroxy benzoic acid (g.) |
|---|---|---|---|---|
| 20 | n-Octyl alcohol, 60 | 0.1 | 7.3 | 7.4 |
|  | Diphenyl ether, 60 | 5.2 | 9.0 | 14.2 |
|  | Kerosene (boiling at 180°–250° C.), 60. | 10.0 | 4.3 | 14.3 |
|  | Fraction of gasoline distillate (boiling at 100°–150° C.), 60. | 5.3 | 4.9 | 10.2 |

TABLE 2

| Potassium phenoxide (g.) | Medium, g. | p-Hydroxy benzoic acid (g.) | Salicylic acid (g.) | 4-hydroxy isophthalic acid (g.) | Total of hydroxy benzoic acid (g.) |
|---|---|---|---|---|---|
| 20 | None | 2.1 | 0.21 | 0.01 | 2.32 |
|  | Diphenyl ether, 60 | 7.6 | 0.38 | 0.38 | 8.36 |
|  | Light oil (boiling at 200–310° C.), 60 | 11.0 | 0.03 | <0.01 | 11.04 |

The results of above two tables indicate that the process of this invention employing kerosene or light oil boiling at 180°–310° C. is much superior to the processes employing no medium or a higher aliphatic alcohol such as n-octyl alcohol or an aliphatic hydrocarbon which is outside the scope of this invention, with respect to both conversion and selectivity for p-isomer formation. The results also clarify that diphenyl ether as the medium gives a conversion of substantially equal level as of the specific media of this invention, but it exhibits far inferior selectivity for p-isomer formation.

The use of kerosene, light oil or a mixture thereof as the reaction medium in accordance with the invention has further advantages in that, since they are much less expensive than diphenyl ether and other known media, the process is very economical. Furthermore, since the starting potassium phenoxide and p-hydroxy benzoates formed can be very easily suspended in the proposed media of this invention, the subject process is suitable for continuous operation.

In practicing the subject process, potassium phenoxide is suspended in a medium selected from the group consisting of kerosene, light oil and mixtures thereof, preferably a medium which has been refined with an acid and/or alkali, and carbon dioxide is introduced through the suspension. The preferred ratio of potassium phenoxide to the medium is 0.05 to 2 parts, particularly 0.1 to 0.5 part, of the former per one part of the latter, the parts being by weight. The reaction temperature is optional so far as is above 180° C., but normally that of 190°–250° C. is preferred. The pressure of carbon dioxide may be atmospheric or super-atmospheric, but a pressure higher than 30 kg./cm.$^2$ is economically meaningless. Normally preferred pressure range is 3–10 kg./cm.$^2$. The recovery of the reaction product can be performed in accordance with the accepted practice, i.e., by the steps of adding water to the reaction mixture to separate the medium layer from the aqueous layer containing potassium p-hydroxy benzoates as dissolved therein, and acidifying the aqueous phase with hydrochloric acid, whereby recovering the object p-hydroxy benzoic acid. The subject process again can be effectively performed by agitating the reaction system.

According to the invention, furthermore process for the production of p-hydroxy benzoic acid is proposed, in which potassium phenoxide is suspended, together with 0.01 to 10 moles of phenol per mole of potassium phenoxide, in the phase of a reaction medium which is liquid under the reaction conditions and is a non-solvent to potassium phenoxide, and contacted with carbon dioxide at a pressure of not higher than 30 kg./cm.$^2$, at a temperature not lower than 180° C.

It has been already stated that if potassium phenoxide is dissolved in phenol and reacted with carbon dioxide, the reaction rate is extremely low and selectivity for the p-isomer formation is poor; and that the presence of the phenol by-produced of the reaction of potassium phenoxide with carbon dioxide lowers the yield of hydroxy benzoic acid. However, we discovered that if, for example, 2 moles of phenol is first added to 1 mole of dipotassium p-hydroxy benzoate, potassium phenoxide and monopotassium p-hydroxy benzoate are formed; and that if the phenol addition is applied to the dipotassium salt of p-hydroxy benzoic acid formed by Kolbe-Schmitt reaction, monopotassium salt and potassium phenoxide are formed, the latter reacting with carbon dioxide to improve p-hydroxy benzoic acid yield. We furthermore discovered that when phenol is added in the specific quantity as will cause the above-described reaction, the starting potassium phenoxide is liquefied with the phenol under the reaction conditions, and the reaction progresses more uniformly. In that case, the p-hydroxy benzoate formed is precipitated out of the system as solid. The solid product tends to enwrap the starting liquid system, causing the reaction system to become blocky and heterogeneous. Thus smooth progress of the reaction is hindered. As an effective solution of this problem, we discovered that if the starting materials, are first suspended as liquid particles in a suitable reaction medium which is liquid under the reaction conditions and is a non-solvent to potassium phenoxide, the reaction progresses very advantageously. Concerning the phenol-potassium phenoxide system, *Comptes Rendus Hebdomadaire des Séances de L'Academie des Sciences*. Paris, Vol. 260, p. 1395 (1965) gives detailed informations, and from the graph showing the relation between the composition of phenol-potassium phenoxide system and melting point, which is given in the same literature, it can be understood that it is possible to maintain the reaction system at liquid state at temperatures around 200° C., for instances, by suitably selecting the ratio of phenol to potassium phenoxide. Incidentally, approximately 200° C. has been considered suitable for the preparation of p-hydroxy benzoic acid.

As the medium which is liquid under the reaction conditions, particularly those which are hydrophobic are preferred. For example, kerosene, light oil, and their mixtures are suitable Other usable media include aromatic hydrocarbon such as diphenyl; aromatic ether such as diphenyl ether; and halogenated aromatic hydrocarbon such as diphenyl polychloride. Since this type of medium hardly dissolves phenol-potassium phenoxide system even at elevated temperatures, it is possible to maintain the system at oily state, and form a suspension of liquid particles with vigorous agitation. Furthermore the medium is capable of precipitating hydroxy benzoate as easily suspendable solid.

In practicing the subject process, potassium phenoxide is suspended in the medium, preferably in an amount of 0.05–2 parts per part of medium, the parts being by weight, and to the suspension 0.01–10 moles, preferably 0.3–3 moles, per mole of potassium phenoxide, of phenol is added. Thereafter the system is heated and liquefied, and formed into particulate suspension by vigorous stirring or other suitable means. Thus formed suspension is then contacted with carbon dioxide. The reaction temperature should be not lower than 180° C., preferably 180–280° C., and the pressure of carbon dioxide may be atmospheric or super-atmospheric, so far as it does not exceed 30 kg./cm.$^2$, the preferred range being 3–15 kg./cm.$^2$. After the reaction, the reaction mixture is cooled if necessary, and water is added thereto to separate the aqueous layer from the medium layer. Acidifying the aqueous layer with hydrochloric acid, p-hydroxy benzoic acid is recovered.

According to the above-described process, p-hydroxy benzoic acid can be selectively obtained at higher yield than those of conventional methods, by the reaction within a short period. For instance, if 1 mole of phenol is added to 1 mole of potassium phenoxide and suspended in light oil as liquid particles, and reacted with carbon dioxide of 10 kg./cm.$^2$ at pressure, at 230° C. for an hour, the yield of hydroxy benzoic acid based on potassium phenoxide reaches 75%, and that of salicylic acid is below 0.5%. This result is indeed surprising. Furthermore, the process is apparently well suited for continuous operation.

Again according to the present invention, process for the production of p-hydroxy benzoic acid is provided, which comprises suspending a reactant, which is either potassium phenoxide or a mixture thereof with phenol, in a liquid hydrocarbon boiling at 180–350° C., selected from a group consisting of kerosene, light oil and mixtures thereof, and contacting the suspension with carbon dioxide of a pressure not higher than 30 kg./cm.$^2$, at a temperature not lower than 180° C., during the contact reaction dispersing the reactant and carbon dioxide as fine particles in the liquid hydrocarbon by means of mechanical agitation.

In practicing this process, potassium phenoxide or a potassium phenoxide-phenol mixture is suspended in light oil, kerosene, or a mixture of the two, and carbon dioxide is introduced into the suspension while the system is agitated with an agitator of high efficiency, whereby finely dispersing both the gas and the suspension. The agitation is so selected as to make the diameter of the dispersed particles less than 300$\mu$. Light oil or kerosene boiling at 180°–350° C., particularly 200–310° C., is suitable for this process. The reaction temperature should be above 180° C., preferably 190–250° C., and pressure of carbon dioxide is advantageously upon to 30 kg./cm.$^2$, preferably 3–15 kg./cm.$^2$. Molar ratio of phenol per mole of potassium phenoxide may range 0.01–10, preferably 0.3–3.

In the above-described process, it is necessary to suspend potassium phenoxide or a potassium phenoxide-phenol mixture in light oil, kerosene, or a mixture thereof, and to disperse the suspended matter together with the gas as fine particles, so as to prevent the settlement of the former, utilizing a special agitation mechanism. For this purpose, for example, an agitator for gas absorption as illustrated in FIG. 2 is employed.

Figure 1:
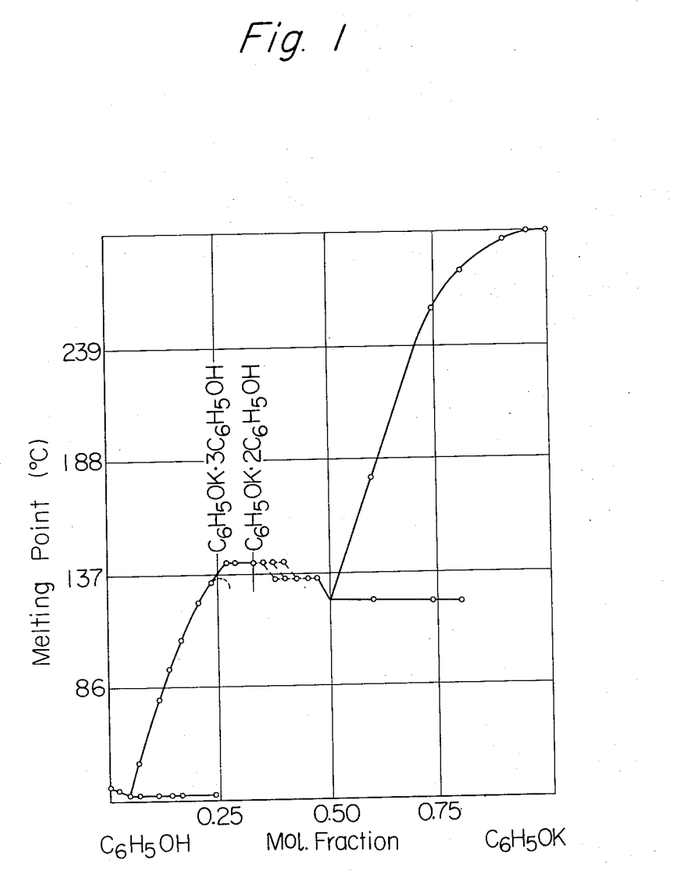
FIG. 1 is the said graph showing the correlation between the composition and melting point of phenol-potassium phenoxide system.
Figure 2:
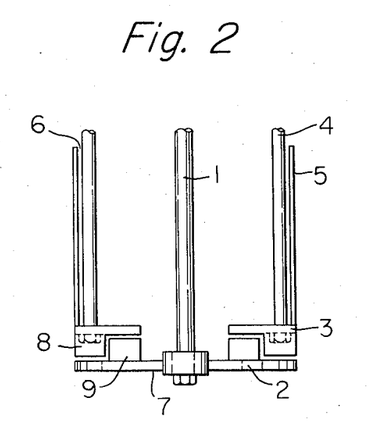
FIG. 2 is a vertical section of an agitator suited for practicing the invention.

Referring to FIG. 2, 1 is the rotation axis of which r.p.m. is variable, since it is directly connected to a variable speed motor. On the tip of the axis 1, rotating blades 2 are mounted. Fixed plate 3 is supported by rod 4, which does not rotate. At the exterior of the supporting rod 4, suction pipe 5 whose height is adjustable is provided. The reactant and the gas enter into the reaction system from the suction mouth 6 of suction pipe 5 and holes 7 below the blades 2, and discharged therefrom in the form of fine particles in radical direction, from the spaces between partition 8 of fixed plate 3 and partition 9 of the blades 2.

Figure 3:
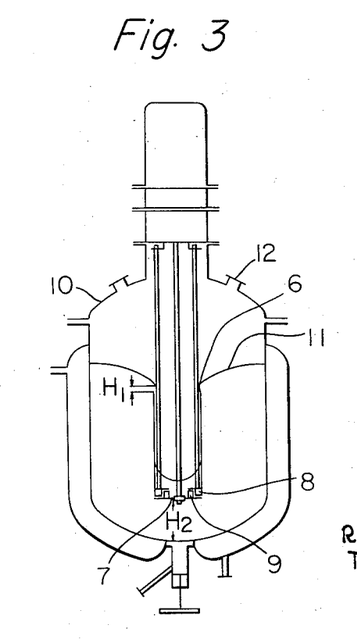
FIG. 3 is a vertical section of the reaction for showing the condition of the agitator of FIG. 2 in operation.

The state of the agitator in operation is illustrated in FIG. 3. Referring to the drawing, as the agitator placed inside the reactor 11 is rotated, the suspension and carbon dioxide are sucked from the suction mouth 6 and holes 7 under the rotating blades of the agitator, and ejected as fine size particles from the spaces between partition 8 and partition 9 into the reaction mixture outside the agitator. As the agitation is continued, the liquid level draws a curve as marked 12, and the reaction rapidly progresses. Normally the reaction is completed within surprisingly short period, such as 30 minutes, and within as short as 10 minutes when potassium phenoxide is the starting material.

This process possesses such advantages, in addition to those described as to the afore-described processes, as that small size reactor can be effectively used, and that the reaction time is one-ninth the case of using diphenyl ether as the solvent, and one-twenty-fourth that required for solid-gaseous phase reaction. These advantages are industrially very significant.

The invention further provides a process for the production of p-hydroxy benzoic acid which comprises suspending potassium phenoxide in a liquid hydrocarbon boiling at 180°–350° C. selected from the group consisting of kerosene, light oil and mixtures thereof, contacting the suspension with carbon dioxide under a pressure not higher than 30 kg./cm.$^2$ at a temperature not lower than 180° C., adding water to the reaction mixture formed to distribute phenol to the aqueous layer containing p-hydroxy benzoates and the liquid hydrocarbon layer, in the presence of not less than equivalent to the unreacted potassium phenoxide of p-hydroxy benzoic acid or a primary salt thereof, separating and recovering phenol from the liquid hydrocarbon layer, separately contacting the aqueous layer with an extracting liquid medium which dissolves phenol but is immiscible with water at temperatures not exceeding 100° C. to remove phenol from the aqueous layer, and recovering p-hydroxy benzoic acid from the remnant of the aqueous layer.

This particular process exhibits particularly such advantages, in addition to those advantages described as to the foregoing processess, that the by-produced phenol and unreacted potassium phenoxide can be recovered and recycled with high efficiency, and that high purity p-hydroxy benzoic acid can be obtained.

In the already described processes, free p-hydroxy benzoic acid is recovered simply by adding water to the reaction mixture to transfer the p-hydroxy benzoates into the aqueous layer, and treating the layer with an acid. In that case, however, the unreacted potassium phenoxide is simultaneously transferred into the aqueous layer and recovered together with p-hydroxy benzoic acid upon the acid treatment. Thus the purity of p-hydroxy benzoic acid is impaired, and recovery of phenol is neither ideal. Whereas, according to this particular process, the potassium phenoxide in the aqueous layer is converted to phenol, and with the recovery of the phenol, p-hydroxy benzoic acid can be refined. The process utilizes the fact that alkali phenolate, e.g. potassium phenoxide, reacts with p-hydroxy benzoic acid or primary salt thereof, e.g., monopotassium p-hydroxy benzoate, in an aqueous solution according to the formula below, and produces free phenol.

To wit, according to this process, when the reaction mixture resulting from the reaction of potassium phenoxide with carbon dioxide, which comprises kerosene and/or light oil, by-produced phenol, potassium p-hydroxy benzoates and a minor amount of unreacted potassium phenoxide, fails to contain a primary salt of p-hydroxy benzoic acid, or when the amount of the salt is less than the equivalent to the potassium phenoxide, the balance or greater amount of p-hydroxy benzoic acid or a primary salt thereof is added to the reaction mixture. Then water is added to the system to cause complete dissolution of p-hydroxy benzoates, and to separate the system into the liquid hydrocarbon and aqueous layers, when the by-produced phenol and the phenol which is freed from unreacted potassium phenoxide are distributed into the two layers. The addition of p-hydroxy benzoic acid or a primary salt thereof may be effected after the addition of water. In that case, the minor amount of potassium phenoxide transferring into the aqueous layer provides free phenol in accordance with the foregoing formula, and thus phenol is similarly distributed into two layers.

The phenol in kerosene and/or light oil is treated with aqueous caustic potash, and recovered as an aqueous solution of potassium phenoxide. Separately, phenol in the aqueous layer is extracted with a liquid medium which dissolves phenol but is immiscible with water, and then similarly converted to aqueous potassium phenoxide solution by aqueous caustic potash treatment. The extraction may be performed at temperatures between room temperature and boiling point of the solvent or water. The temperature can be suitably adjusted by adjusting in advance the cooling temperature of the reaction mixture resulting from the p-hydroxy benzoic acid preparation from potassium phenoxide, and then by addition of water. The quantity of the extracting medium is adjustable depending on the distribution coefficient of phenol with water.

Primary salts of p-hydroxy benzoic acid which are useful for this process are the salts formed at the carboxyl radical of p-hydroxy benzoic acid, including such salts with alkali metal, alkaline earth metal, and other metals, ammonium, and organic base, etc. Water-soluble salts are preferred, and potassium salt is particularly advantageous.

The hydrophobic solvent which is liquid below 100° C. and useful for extracting phenol from the aqueous solution containing potassium p-hydroxy benzoate in accordance with this process includes, for example, hydrocarbons such as benzene, toluene, xylene, hexane, cyclohexane, kerosene and light oil; ethers such as dibutyl or diphenyl ether; ketones such as cyclohexanone, diisobutyl ketone, and acetophenone; alcohols of four or greater number of carbons, halogenated hydrocarbons such as dichloromethane, dichloroethane, chloroform and trichloroethylene; and nitrated hydrocarbons such as nitromethane and nitrobenzene.

According to this particular process, the p-hydroxy benzoates formed can be effectively separated from phenol and potassium phenoxide, and high purity p-hydroxy benzoate can be obtained. Furthermore, the separation and recovery of phenol is thermally economical since no heating and cooling steps are required as in rectification. Thus loss due to deterioration is very advantageously prevented, and recovery and recycling of the by-produced phenol can be performed at such high yield as 98.5% or above. It can be understood that this process is well suited not only to continuous reaction of potassium phenoxide with carbon dioxide, but also to the continuous operation of the entire procedures as a whole, including the recovery and recycling of by-produced phenol.

The subject invention also embraces a process for the production of p-hydroxy benzoic acid which comprises suspending an aqueous solution of potassium phenoxide containing up to 20% of water, in a liquid hydrocarbon boiling at 180°–350° C., selected from the group consisting of kerosene, light oil and mixtures thereof, dehydrating the suspension by heating the same at 200°–250° C. for no longer than 10 seconds, optionally adding phenol, contacting carbon dioxide of a pressure not higher than 30 kg./cm.$^2$ with the dehydrated suspension at a temperature not lower than 180° C., while dispersing the carbon dioxide and the reactant as fine particles in the liquid hydrocarbon by means of agitation, adding water to the resulting reaction mixture, thereby distributing phenol into an aqueous layer containing p-hydroxy benzoic acid and the liquid hydrocarbon layer, in the presence of not less than the equivalent to unreacted potassium phenoxide of p-hydroxy benzoic acid or a primary salt thereof, separating and recovering phenol from the liquid hydrocarbon layer, contacting the aqueous layer with an extracting liquid medium which dissolves phenol but is immiscible with water, at a temperature not higher than 100° C. to separate phenol from the aqueous layer, recovering p-hydroxy benzoic acid from the remaining aqueous layer, neutralizing the solutions containing phenol with aqueous caustic potash, separating therefrom aqueous potassium phenoxide solution, and recycling the same to the initial step.

Since potassium phenoxide used as the staring material of this process is extremely hygroscopic, its drying requires very high temperatures. Furthermore, if air is present under the high temperatures, the product decomposes immediately. Accordingly, dehydration of potassium phenoxide requires extreme care and complex procedures, and preparation of the product of the rated water content is difficult. Industrially, such apparatuses as vacuum drum dryer, spray dryer employing nitrogen circulation and vacuum rotary dryer are used for this purpose, but the equipment and operating costs are very high. Furthermore, continuous operation has been difficult.

The above-specified process effectively overcomes these difficulties, and further enables effective recycling of the phenol recovered, in addition to the other advantages ascribed to the foregoing processes.

In practicing this process, it is needed to previously concentrate the aqueous solution of potassium phenoxide to approximately 80%, preferably approximately 90%, in order to improve thermal efficiency. (The solution is liquid at 190° C.) To the solution then kerosene and/or light oil boiling at 180°–350° C., preferably 200°–310° C. is added and well dispersed. The suspension is fed into, for example, a flash evaporator equipped with an agitator rotating at a high velocity. Since the evaporator is heated to 200-250° C., e.g. 240° C., in advance, the water content of the suspension is reduced to 0.1% or less instantaneously, i.e. within 10 seconds, preferably within 5 seconds. We first suspended an aqueous solution of potassium phenoxide or a potassium phenoxide-phenol mixture in a reaction medium, and heated the suspension at 200–250° C. for no longer than 10 seconds. We discovered that, whereby potassium phenoxide suitably dehydrated so as to be useful for the subject reaction can be obtained within much shorter time and with much simpler operation than the conventional practices.

The conditions for the subsequent reaction of the dispersed fine particles and the separation and recovery of the by-produced phenol and unreacted potassium phenoxide are identical with those already described. However, in accordance with this process, recycling of the recovered phenol can be very effectively performed. Because, since both the by-produced phenol and unreacted potassium phenoxide are recovered ultimately in the form of aqueous solution of potassium phenoxide from both the reaction medium layer and the aqueous layer containing potassium p-hydroxy benzoates, the solutions can be combined and immediately concentrated to a water content of 20% to serve again as the starting material of the present process.

The invention furthermore includes a process for the production of p-hydroxy benzoic acid which comprises suspending a reactant selected from a group consisting of potassium phenoxide and mixtures of potassium phenoxide with phenol, in a liquid hydrocarbon selected from the group consisting of kerosene, light oil and mixtures thereof which are boiling at 180°–350° C., in an amount of 0.05 to 2 parts by weight of potassium phenoxide per one weight part of the liquid hydrocarbon, contacting the suspension with carbon dioxide of a pressure not higher than 30 kg./cm.² at a temperature not lower than 180° C., adjusting the molar ratio of the resultant dipotassium p-hydroxy benzoate to phenol in the reaction mixture to 1:1–1:30, thereby forming a liquid phase containing phenol-potassium phenoxide mixture and a precipitate layer of p-hydroxy benzoates, separating and recovering the p-hydroxy benzoates from the precipitate layer, and recovering and recycling potassium phenoxide from the liquid phase with advantage.

With this process the p-hydroxy benzoic acid yield based on potassium phenoxide is further improved, by the improved arrangement for recovery and recycling of by-produced phenol and unreacted potassium phenoxide. According to the arrangement, by-produced phenol and unreacted potassium phenoxide are recovered and recycled, utilizing the fact that when phenol and dialkali p-hydroxy benzoate, e.g., dipotassium p-hydroxy benzoate, are present in a medium at a specific ratio, the two react as in the formula below:

Thus, for example, when the molar ratio of dipotassium p-hydroxy benzoate to phenol is 1:2–10, potassium phenoxide and monopotassium p-hydroxy benzoate are obtained with a yield of 60%, and when the molar ratio is 1:20, the yield becomes as high as 90%.

According to this process, phenol is either removed by such means as evaporation from, or added to, the reaction mixture resulting from the reaction of potassium phenoxide with carbon dioxide in accordance with any of the foregoing processes, so that the molar ratio of dipotassium p-hydroxy benzoate to phenol in the mixture should become 1:1–1:30, preferably 1:1.5–1:20. Then potassium p-hydroxy benzoate is separated from the system by filtration while the system is maintained at room temperature or above, preferably 50°–250° C. Note that when the temperature is above 200° C., the filtration is performed preferably under a superior atmospheric pressure of carbon dioxide. At the filtration temperature, the phenol-potassium phenoxide mixture is liquid, and transfers into the filtrate. p-Hydroxy benzoates are obtained as the residue since they are difficulty soluble in the phenol-potassium phenoxide mixture and the solvent employed. p-Hydroxy benzoic acid is recovered from the residue with an acid treatment. On the other hand, the filtrate containing the phenol-potassium phenoxide mixture can be recycled for the reaction with carbon dioxide, after optional treament such as addition of further potassium phenoxide or removal of excessive phenol by any suitable means such as evaporation. Or, the phenol in the filtrate may be converted entirely to potassium phenoxide with addition of the required quantity of potassium hydroxide.

When the potassium source is thus recovered as potassium phenoxide in accordance with this process, p-hydoxy benzoic acid yield based on potassium phenoxide can be as high as 90%. Furthermore, according to this process, the phenol-potassium phenoxide mixture contained in the medium from which p-hydroxy benzoates have been removed can be recycled for further reaction with carbon dioxide, without further treatment or, if necessary, after removal of phenol therefrom by evaporation, etc., or addition of potassium phenoxide. The process requires no special equipments or complicated treatments for the recovery and recycling of potassium source, and employs no additional substance other than the starting compounds. Thus, with this process the recovery and recycling of the potassium source can be performed with ease and simplicity.

Hereinafter the invention will be explained in further detail with reference to the examples, it being understood that the examples are given strictly for illustrative purpose, but in no sense limitative of the invention.

EXAMPLE 1

Twenty (20) g. of potassium phenoxide and 60 g. of kerosene (boiling at 220°–250° C.) were mixed in a pressure-resistant container. The temperature in the container was raised while nitrogen current was passed therethrough, and at approximately 200° C. nitrogen was replaced with carbon dioxide. The reaction was performed at atmospheric pressure and 210° C., for 2 hours. Thereafter the reaction mixture was cooled and added with 60 g. of water. The insoluble medium layer was separated, and the remaining aqueous layer was acidified with hydrochloric acid. Thereupon 9.9 g. of p-hydroxy benzoic acid was obtained, in a yield of 47% based on potassium phenoxide. The quantity of by-produced salicylic acid was 0.1 g.

EXAMPLE 2

An electromagnetic agitation-type autoclave was charged with 20 g. of potassium phenoxide and 60 g. of kerosene (boiling at 200–250° C.), and carbon dioxide was absorbed therein at a pressure of 3 kg./cm.$^2$. Thereafter the temperature was raised while the carbon dioxide pressure was maintained at 3 kg./cm.$^2$, and the reaction was continued for 2 hours at 220° C. Cooling the system, carbon dioxide was discharged. Then the content was taken out of the autoclave and added with 60 g. of water. Insoluble medium layer was thus separated, and the remaining aqueous layer was acidified with hydrochloric acid. Thus 10.5 g. of p-hydroxy benzoic acid was obtained, in a yield of 50% based on potassium phenoxide. Also 0.2 g. of salicylic acid was by-produced.

EXAMPLE 3

Example 2 was repeated except that kerosene was replaced with light oil which had been refined with an acid and alkali and redistilled (boiling at 250°–350° C.). Thus 10.7 g. of p-hydroxy benzoic acid was obtained in a yield of 51% based on potassium phenoxide. The quantity of by-produced salicylic acid was 0.25 g.

EXAMPLE 4

In an agitation-type autoclave, 20 g. of potassium phenoxide and 80 g. of light oil (boiling at 200–310° C.) were mixed. While nitrogen current was passed through the autoclave, the temperature of the system was raised, and at approximately 220° C. nitrogen was replaced by carbon dioxide. The reaction was performed at a pressure of 5 kg./cm.$^2$ and a temperature of 230° C. for 1 hour. Subsequent treatments were performed similarly to Example 1, and 11.0 g. of p-hydroxy benzoic acid was obtained in a yield of 53% based on potassium phenoxide. Also 0.03 g. of salicylic acid and less than 0.01 g. of 4-hydroxy isophthalic acid were by-produced.

Control 1

Twenty (20) g. of potassium phenoxide and 80 g. of fraction of petroleum distillate (boiling at 100°–150° C.) were fed in an electromagnetic agitation-type autoclave, and the space in the autoclave was substituted with nitrogen. The temperature was raised, and at approximately 220° C., carbon dioxide was introduced so as to maintain a partial pressure of 5 kg./cm.$^2$. After 2 hours of reaction, the system was cooled and carbon dioxide was discharged. To the reaction mixture, 60 g. of water was added to separate the insoluble medium layer. Upon acidifying the remaining aqueous layer with hydrochloric acid, 7.8 g. of p-hydroxy benzoic acid was obtained in a yield of 37% based on potassium phenoxide. The quantity of by-produced salicylic acid was 0.2 g.

EXAMPLE 5

Figure 4:
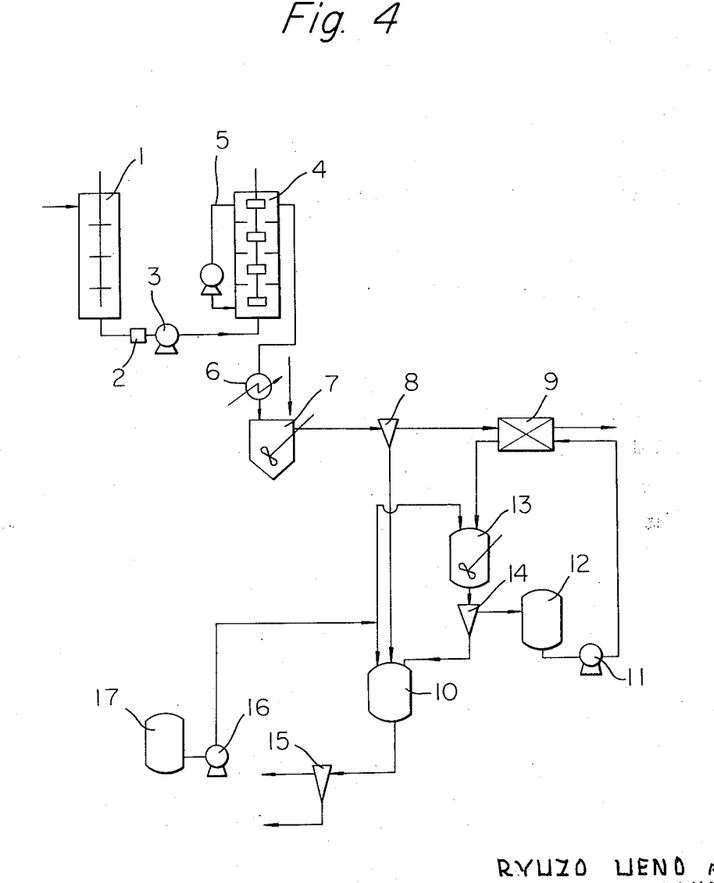
FIGS. 4 and 5 are the flow sheets showing examples of equipments employed for practicing the invention.

Using the apparatus illustrated in FIG. 4, in the evaporation tank 1, a 90% aqueous potassium phenoxide solution maintained at 170° C. was suspended in about four weight parts of light oil (boiling at 200°–310° C.) to the potassium phenolate and the suspension was discharged from the tank 1 at a rate of 102 kg./hr. The potassium phenoxide suspension (containing 20 kg. of potassium phenoxide) of 230° C., leaving the tank 1 was sent to the reactor 4 which was maintained at 230° C., through the mixer 2, by means of pump 3. The carbon dioxide circulating mechanism 5 was maintained at a pressure of 5 kg./cm.$^2$. The residence time of the reaction mixture in the reactor 4 was 1 hour. Thus 105.95 kg. of the reaction mixture (consisting of 15.56 kg. of dipotassium p-hydroxy benzoate, 1.62 kg. of monopotassium p-hydroxy benzoate, 6.57 kg. of phenol, 0.20 kg. of potassium phenoxide and 82 kg. of the light oil) per hour was cooled to 100° C. at the heat exchanger 6, and sent to the dissolution vessel 7. Separately, 34.8 kg. per hour of water was fed into the vessel 7. The liquid temperature was adjusted to 70° C., and the p-hydroxy benzoates were completely dissolved in water. Then the liquid was separated into aqueous layer and light oil layer with the separator 8. The aqueous layer was contacted with 29.6 kg. per hour of toluene fed from the tank 12 by means of pump 11 as counter currents, in the centrifugal extractor 9, and separated into an aqueous layer and a toluene layer. The toluene layer was neutralized in the tank 13, by 5.54 kg. per hour of 50% aqueous caustic potash which was fed from the tank 17 by pump 16, to form two layers of toluene and aqueous solution of potassium phenoxide. The layers were subsequently separated by the separator 14. The toluene was returned to tank 12, and the aqueous potassium phenoxide was sent to tank 10. The aqueous layer leaving the centrifugal extractor 9 was sent to a separate acid-treating device, and wherefrom 11.07 kg. per hour of p-hydroxy benzoic acid was obtained (the yield based on potassium phenoxide being 53%). Separately, the light oil layer separated by the separator 8 was sent to tank 10 to be neutralized with 2.33 kg. per hour of 50% aqueous caustic potash which was sent from tank 17 by pump 16, and formed into two layers of light oil and aqueous solution of potassium phenoxide. The layers were separated by the separator 15, and each recycled for repetitive use.

Thus recovered potassium phenoxide, in terms of phenol, amounted to 6.61 kg. (1.96 kg. from the light oil layer, and 4.65 kg. from the toluene layer) which corresponds to a recovery of 98.6%. Also 80.9 kg. of the light oil and 29.1 kg. of toluene were recovered, each corresponding to the recovery of, respectively, 98.7% and 98.4%.

Thus recovered potassium phenoxide, light oil and toluene were repeatedly used for the continuous reaction and separation, without substantial change in any of p-hydroxy benzoic acid yield and recoveries of phenol, light oil and toluene.

EXAMPLE 6

Two (2) kg. of potassium phenoxide and 10 kg. of light oil were mixed in an agitation-type autoclave, and to the mixture 1.4 kg. of phenol was added under vigorous agitation. Nitrogen was passed through the autoclave, and the temperature was raised to 230° C., at which nitrogen was replaced by carbon dioxide. The reaction was performed under a pressure of 10 kg./cm.$^2$ for an hour. Then the reaction mixture was cooled, added with water and stirred. Aqueous layer formed upon standing of the system was separated, and acidified with hydrochloric acid. Thus 1.57 kg. of p-hydroxy benzoic acid was obtained, the yield based on potassium phenoxide being 75%. The side-production of salicylic acid was less than 0.5%.

Control 2

Two (2) kg. of potassium phenoxide was mixed with 10 kg. of light oil in an agitation-type autoclave. The autoclave was heated while nitrogen was passed therethrough, and at 230° C. nitrogen was replaced with carbon dioxide. The reaction was performed for an hour under a pressure of 10 kg./cm.$^2$ with violent agitation. Thereafter the reaction mixture was cooled, added with water, stirred, and let stand. Thus formed aqueous layer was separated and acidified with hydrochloric acid. Thus 1.10 kg. of p-hydroxy benzoic acid was obtained, the yield based on potassium phenoxide being 53%. The salicylic acid by-produced was less than 0.5%.

EXAMPLE 7

Two (2) kg. of potassium phenoxide was mixed with 10 kg. of kerosense in an agitation-type autoclave, and to the mixture 1 kg. of phenol was added with vigorous stirring. The autoclave was heated while nitrogen was passed therethrough, and at 230° C. nitrogen was replaced by carbon dioxide. The reaction was performed for an hour at 5 kg./cm.$^2$. The subsequent procedures were performed in the similar manner to Example 6. Thus 1.47 kg. of p-hydroxy benzoic acid was obtained, the yield based on potassium phenoxide being 70%. Side-production of salicylic acid was not appreciable.

When kerosene was replaced by diphenyl, diphenyl ether or diphenyl trichloride, the p-hydroxy benzoic acid obtained respectively was 1.25 kg. (60% yield) 1.23 kg. (59% yield) and 1.19 kg. (57% yield). In all three cases the side-production of salicylic acid was thess than 0.5%.

EXAMPLE 8

To 3.33 kg. of 60% aqueous solution of potassium phenoxide, 8.0 kg. of light oil was added, and heated to 230° C. Thereafter the system was let stand for 30 minutes, during which water was evaporated. Thus a potassium phenoxide suspension was formed. To this suspension 1.4 kg. of phenol was added and dispersed therein by stirring with an agitator for approximately 10 minutes. Then, while the temperature was maintained at 230° C., carbon dioxide was introduced into the reactor to a pressure of 10 kg./cm.$^2$. The reaction was continued for an hour, in the meantime additional carbon dioxide being supplied to maintain the said pressure level. Then the reaction mixture was cooled to 150° C., added with water. From the aqueous phase phenol was extracted with toluene, and the remaining aqueous phase was acidified to produce 1.57 kg. of p-hydroxy benzoic acid. The product was substantially pure p-hydroxy benzoic acid, and the yield based on potassium phenoxide was 75%.

EXAMPLE 9

Using the apparatus illustrated in FIG. 4, a 90% aqueous solution of potassium phenoxide was maintained at 170° C. in the evaporation tank 1, and to which four weight parts of light oil to the potassium phenoxide was added to form a suspension. The suspension was discharged at a rate of 102 kg. per hour. To the potassium phenoxide suspension of 230° C. leaving the tank 1, 0.7 mole of phenol per mole of potassium phenoxide was added and dispersed at the mixer 2. Thus formed reactant solution (liquid particle suspension) was fed into the reactor 4 which was maintained at 230° C. by pump 3. In the carbon dioxide circulation mechanism 5, the pressure of 5 kg./cm.$^2$ was maintained. The reaction product was discharged from the upper part of the reactor, cooled to 150° C. by the heat exchanger 6, and introduced into the water in dissolution vessel 7. Then the system was separated into an aqueous layer and light oil layer with the separator 8. The upper light oil-phenol layer was fed to tank 10, and neutralized with the aqueous caustic potash fed from tank 17 with pump 16. Upon neutralization, it was separated into light oil layer and aqueous layer containing potassium phenoxide as dissolved therein. The both layers could be respectively recycled for repetitive use. The lower aqueous solution-phenol layer was extracted with toluene at a continuous centrifugal extractor 9, and separated into aqueous layer and toluenephenol layer. The former was subjected to an acid treatment, and the latter was neutralized with aqueous caustic potash at the neutralizing core 13, to be separated into toluene layer and aqueous solution of potassium phenoxide. The latter solution was duly recycled.

Thus, from the suspension fed to the evaporation tank 1 at a rate of 102 kg./hr. (containing 20 kg. of potassium phenoxide) 14.84 kg./hr. of p-hydroxy benzoic acid was obtained. This corresponds to a yield based on potassium phenoxide of 71%. Only trace of by-produced salicylic acid was detectable. The recoveries of phenol, light oil and toluene were more than 98.5% without exception.

EXAMPLE 10

An autoclave of 70-liter capacity equipped with the agitator illustrated in FIG. 3 was charged with 6 kg. of potassium phenoxide and 30 liters of light oil, and the agitator was vigorously rotated. The r.p.m. of the agitator was 1,500, and the suction mouth was so located that the space H1 from the reaction liquid level 12 was 5 mm. The space H2 between the position of the blades and the bottom of the autoclave was 150 mm.

Then nitrogen was introduced from the inlet 13, and the autoclave was externally heated to 230° C., when nitrogen was replaced by carbon dioxide. The reaction was performed for 10 minutes at the gaseous pressure of 10 kg./cm.$^2$. The reaction mixture was then cooled, added with water and stirred, and let stand. The aqueous layer thus formed was acidified with hydrochloric acid, to produce 3.38 kg. of p-hydroxy benzoic acid, the yield based on potassium phenoxide being 54%. Side-formation of salicylic acid was negligible.

When r.p.m. of the agitator was reduced to 1,000 in the above procedures, the reaction failed to be completed within 20 minutes. Whereas, when the r.p.m. was increased to 2,000 or above, the reaction completed within 8 minutes.

As control, the light oil was replaced with diphenyl ether, with the result that p-hydroxy benzoic acid yield was only 48% even after 2 hours of the reaction. When no medium was used, the yield reached 58% only after 4 hours.

EXAMPLE 11

The same autoclave as employed in Example 10 was charged with 6 kg. of potassium phenoxide and 30 liters of light oil, and to the system 3 kg. of phenol was added under vigorous agitation. The r.p.m. of the agitator was 2,000. The height of the suction mouth 6 was adjusted so as to make H1 5 mm., and H2 was 70 mm.

Then similarly to Example 10, the reaction was performed at 230° C. for 30 minutes at a pressure of 10 kg./cm.$^2$ under carbon dioxide introduction. Thus 4.41 kg. of p-hydroxy benzoic acid was obtained, the yield based on potassium phenoxide being 70%. The side-production of salicylic acid was less than 0.5%.

When the r.p.m. of the agitator was increased to 2,500, substantially similar result was obtained. The yield neither changed when kerosene was used as the reaction medium.

It was also discovered that the preferred H1 ranges 2–8 mm.

EXAMPLE 12

Figure 5:
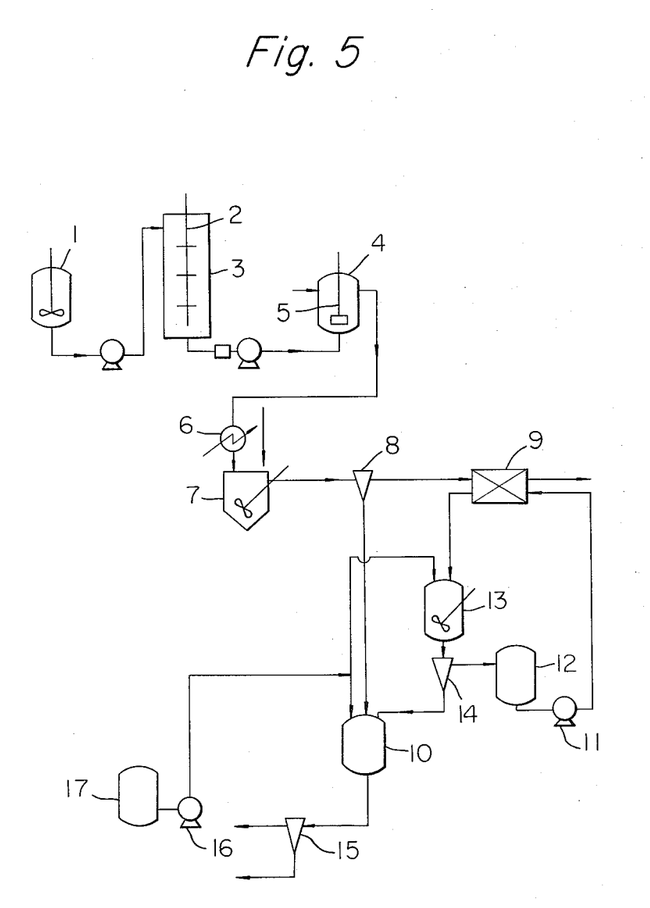

Using the apparatus shown in FIG. 5, 4.27 kg. of phenol was put in a stainless steel container equipped with an agitator, and vigorously stirred as 5.08 kg. of 50% aqueous caustic potash was added thereto. In the meantime the temperature was raised to 190° C. to concentrate the system. To the so obtained approximately 90% aqueous solution of potassium phenoxide, 30 liters of light oil boiling at 200–310° C. was added and thoroughly mixed. The mixture was fed to a flash evaporator 3 of 30 cm. in diameter and 250 cm. in length, equipped with an agitator 2, at a rate of 100 liters/hour. Through the jacket of the evaporator 3, "Kanechlor" (tradename: diphenyl polychloride) of 250° C. was passed. The suspension leaving the evaporator 3 contained 0.11% of water (based on potassium phenoxide) at 235° C. This suspension was led to a stainless steel autoclave 4 of 70-liter capacity, and reacted with carbon dioxide under a pressure of 5 kg./cm.$^2$, at 230° C. The carbon dioxide absorption ceased after 10 minutes. The agitator 5 in the autoclave was a turbine agitator for gas absorption, and the r.p.m. employed was 2,000.

The reaction mixture was quenched to 100° C. at the heat exchanger 6, and transferred to the dissolution vessel 7. Separately, 13 liters/hour of water was introduced into the vessel 7, and the mixture was separated into the aqueous layer and light oil layer with the separator 8. The upper light oil layer contained 0.58 kg. of phenol, and the lower aqueous layer contained 0.69 kg. of monopotassium p-hydroxy benzoate, 4.28 kg. of dipotassium p-hydroxy benzoate, 1.38 kg. of phenol and 0.06 kg. of potassium phenoxide. The light oil layer was sent to tank 10, to be neutralized by the 50% aqueous caustic potash sent from tank 17. Whereby the layer was divided into aqueous potassium phenoxide solution and light oil layer, which were separated by the separator 15. The aqueous layer isolated at the separator 8 was contacted in a centrifugal extractor 9 with 19 kg./hour of toluene fed from tank 12, and formed into aqueous layer and toluene layer. The latter was neutralized in the vessel 13 with 50% aqueous caustic potash fed from tank 17, and separated into an aqueous solution of potassium phenoxide and toluene layer with the separator 14. The latter was returned to tank 12, and the former was led to tank 10. The aqueous layer isolated at the centrifugal extractor 9 was sent to a separate acidifying apparatus.

Thus obtained potassium phenoxide totalled 1.96 kg. in terms of phenol (0.57 kg. from light oil layer and 1.39 kg. from toluene layer), which corresponds to a recovery of 98.5%. The recoveries of light oil and toluene both exceeded 98%. From the acidification apparatus, 3.31 kg. of p-hydroxy benzoic acid was obtained, the yield being 53%. The product's salicylic acid content was negligible.

Thus recovered potassium phenoxide, light oil and toluene were recycled for repetitive use, without changing the p-hydroxy benzoic acid yield and recoveries of phenol, light oil and toluene.

Similar results were obtained when the light oil was replaced by kerosene.

Also when the potassium phenoxide was replaced by a potassium phenoxide-phenol (1:0.7) mixture and the reaction was performed at 220° C. under carbon dioxide pressure of 5 kg./cm.$^2$, the reaction completed by 30 minutes, and p-hydroxy benzoic acid yield based on potassium phenoxide was 70%. The side-formation of salicylic acid was less than 0.5%.

As a control, in the above embodiment, the reaction medium was replaced by diphenyl ether. Even after 2 hours' reaction, p-hydroxy benzoic acid yield was 48%. If no medium was used, the yield reached 58% only after 4 hours' reaction.

EXAMPLE 13

Twenty (20) g. of potassium phenoxide was mixed with 80 g. of kerosene (boiling at 200–260° C.) in an agitation-type autoclave, and the temperature of the system was raised to approximately 210° C. in the atmosphere of nitrogen current. At that temperature nitrogen was replaced by carbon dioxide, and the reaction was performed at 220° C. and 5 kg./cm.$^2$ for 30 minutes. The reaction mixture contained 15.75 g. of dipotassium p-hydroxy benzoate, 1.14 g. of monopotassium p-hydroxy benzoate, 0.20 g. of potassium phenoxide, 6.7 g. of phenol and 80 g. of kerosene. The mixture was cooled to 150° C., and carbon dioxide in the autoclave was discharged. To the system then 137 g. of phenol was added, followed by approximately 30 minutes' stirring under nitrogen current. Then the mixture was filtered at 150° C. The insoluble matter was washed with a minor amount of kerosene of the same temperature, and thus obtained p-hydroxy benzoates were dissolved in water. Upon acidifying the solution with hydrochloric acid, 10.5 g. of p-hydroxy benzoic acid was obtained. From the combination of the filtrate and washings, 8.9 g. of potassium phenoxide was recovered. The p-hydroxy benzoic acid yield based on potassium phenoxide was 90%.

When the foregoing procedures were repeated except that the amount of phenol added to the cooled reaction mixture was reduced to 10 g., 10.5 g. of p-hydroxy benzoic acid and 6.0 g. of potassium phenoxide were obtained. The p-hydroxy benzoic acid yield based on potassium phenoxide was 75%.

EXAMPLE 14

Twenty (20) g. of potassium phenoxide was mixed with 80 g. of light oil (boiling at 200–310° C.) in an agitation-type autoclave, and the temperature of the system was raised while nitrogen current was passed through the autoclave. At approximately 220° C., nitrogen was replaced by carbon dioxide, and the reaction was performed at 5 kg./cm.$^2$ and 230° C. for 30 minutes. The reaction mixture contained 15.56 g. of dipotassium p-hydroxy benzoate, 1.62 g. of monopotassium p-hydroxy benzoate, 6.57 g. of phenol, 0.20 g. of potassium phenoxide and 80 g. of light oil. The mixture was cooled to 150° C. and carbon dioxide was discharged. To the cooled mixture 10 g. of phenol was added, followed by approximately 30 minutes' stirring under nitrogen current. Then the mixture was filtered at 150° C. The insoluble matter was washed with a minor amount of light oil of the same temperature. Thus p-hydroxy benzoates were recovered.

The washing was combined with the filtrate, and returned to the agitation-type autoclave. p-Hydroxy benzoates were recovered therefrom with the procedures similar to the above. The salts were combined with those first recovered, and dissolved in water. Acidifying the aqueous solution with hydrochloric acid, 15.6 g. of p-hydroxy benzoic acid was obtained. From the combination of the filtrate remaining after the removal of the p-hydroxy benzoates and the washings, 0.3 g. of potassium phenoxide was obtained. The p-hydroxy benzoic acid yield based on potassium phenoxide was 75%.

EXAMPLE 15

An agitation-type autoclave was charged with 20 g. of potassium phenoxide, 14 g. of phenol and 80 g. of light oil (boiling at 200°–310° C.). While nitrogen current was passed therethrough, the temperature in the autoclave was raised, and its content was thoroughly mixed. At approximately 220° C., nitrogen was replaced by carbon dioxide, and the reaction was subsequently performed at 8 kg./cm.$^2$ and 230° C., for an hour. The reaction mixture contained 11.0 g. of dipotassium p-hydroxy benzoate, 9.1 g. of monopotassium p-hydroxy benzoate, 18.3 g. of phenol, 0.4 g. of potassium phenoxide and 80 g. of light oil. The mixture was cooled to 150° C., and carbon dioxide was discharged, followed by approximately 30 minutes' stirring under nitrogen current. Then the mixture was filtered at 150° C. The insoluble matter was washed with a minor amount of light oil of the same temperature, and thereby recovered p-hydroxy benzoates were dissolved in water. Acidifying the aqueous solution with hydrochloric acid, 14.2 g. of p-hydroxy benzoic acid was obtained. From the combination of the filtrate and washings, 2.0 g. of potassium phenoxide was recovered. The p-hydroxy benzoic acid yield based on potassium phenoxide was 75%.

We claim:
1. A process for the production of p-hydroxy benzoic acid by reacting potassium phenoxide or a mixture of potassium phenoxide and phenol with carbon dioxide, which comprises suspending potassium phenoxide in a liquid hydrocarbon boiling at 180° C.–350° C. selected from the group consisting of kerosene, light oil and mixtures thereof, and contacting the suspension with carbon dioxide under a pressure not exceeding 30 kg./cm.$^2$, at a temperature ranging from 180° C. to 280° C. said potassium phenoxide being present in an amount of 0.05 to 2 parts by weight per part by weight of the liquid hydrocarbon, and when mixtures of potassium phenoxide and phenol are used as the reactants, the ratio of the phenol to potassium phenoxide being 0.01–10 moles of the phenol per mole of potassium phenoxide.

2. The process of claim 1, in which the potassium phenoxide suspension is contacted with carbon dioxide at a temperature between 190–250° C.

3. A method according to claim 1 wherein the reaction is carried out at a pressure between 3–10 kg./cm.$^2$ when phenol is not used in the reaction mixture.

4. A process for the production of p-hydroxy benzoic acid by reacting potassium phenoxide with carbon dioxide, which comprises suspending a reactant selected from the group consisting of potassium phenoxide and mixtures of potassium phenoxide with phenol, in a liquid hydrocarbon boiling at 180° C.–350° C. selected from the group consisting of kerosene, light oil and mixtures thereof, and contacting the suspension with carbon dioxide under a pressure not exceeding 30 kg./cm.$^2$, at a temperature ranging from 180° C. to 280° C., while dispersing the reactant and carbon dioxide as fine particles in the said liquid hydrocarbon by means of mechanical agitation, said potassium phenoxide being present in an amount of 0.05 to 2 parts by weight per part by weight of the liquid hydrocarbon, and when mixtures of potassium phenoxide and phenol are used as the reactants, the ratio of the phenol to potassium phenoxide being 0.01–10 moles of the phenol per mole of potassium phenoxide.

5. A process according to claim 4 wherein the reaction is carried out at a pressure between 3–15 kg./cm.$^2$.

6. The process of claim 4 in which the said reactant and carbon dioxide are converted to fine particles of less than 300μ in diameter.

7. A process for the production of p-hydroxy benzoic acid which comprises suspending potassium phenoxide in a liquid hydrocarbon boiling at 180° C.–350° C. selected from the group consisting of kerosene, light oil and mixtures thereof in such amounts that the potassium phenoxide is present in a ratio of 0.05 to 2 parts by weight per part by weight of the liquid hydrocarbon, contacting the suspension with carbon dioxide under a pressure not exceeding 30 kg./cm.$^2$, at a temperature ranging from 180° C. to 280° C., adding water to the resultant reaction mixture to form an aqueous layer and a hydrocarbon layer, whereby phenol produced during the course of the reaction is distributed both into the aqueous layer containing p-hydroxy benzoates and the liquid hydrocarbon layer, and whereby the unreacted potassium phenoxide which has been transferred to the aqueous layer reacts with p-hydroxy benzoic acid or a primary salt thereof also present in the aqueous layer to form free phenol, said p-hydroxy benzoic acid or primary salt thereof being adjusted by adding further amounts of such acid or primary salt to the aqueous layer, if necessary, so that it is present in amounts not less than the equivalent of the unreacted potassium phenoxide, separating and recovering phenol from the liquid hydrocarbon layer, separately contacting the aqueous layer with an extracting liquid medium which dissolves phenol but is immiscible with water, at a temperature not higher than 100° C., thereby separating phenol from the aqueous layer, and recovering p-hydroxy benzoic acid from the remnant of the aqueous layer.

8. A process for the production of p-hydroxy benzoic acid which comprises suspending an aqueous solution of potassium phenoxide containing up to 20% of water, in a liquid hydrocarbon boiling at 180° C.–350° C. selected from kerosene, light oil and mixtures thereof in such amounts that the potassium phenoxide is present in a ratio of 0.05 to 2 parts by weight per part by weight of the liquid hydrocarbon, heating the suspension at 200° C.–250° C. for no longer than 10 seconds and thereby reducing the water content thereof, introducing carbon dioxide into the dehydrated suspension at a temperature ranging from 180° C. to 280° C. under a pressure not exceeding 30 kg./cm.$^2$, while dispersing the carbon dioxide and the reactant in the liquid hydrocarbon as fine particles by means of mechanical agitation, adding water to the resultant reaction mixture to form an aqueous layer and a hydrocarbon layer, whereby phenol produced during the course of the reaction is distributed both into the aqueous layer containing p-hydroxy benzoates and the liquid hydrocarbon layer, and whereby the unreacted potassium phenoxide which has been transferred to the aqueous layer reacts with p-hydroxy benzoic acid or a primary salt thereof also present in the aqueous layer to form free phenol, said p-hydroxy benzoic acid or primary salt thereof being adjusted by adding further amounts of such acid or primary salt to the aqueous layer, if necessary, so that it is present in amounts not less than the equivalent of the unreacted potassium phenoxide, separating and recovering phenol from the liquid hydrocarbon layer, separately contacting the aqueous layer with an extracting liquid medium which dissolves phenol but is immiscible with water, at a temperature not higher than 100° C., thereby, separating phenol from the aqueous layer, recovering p-hydroxy benzoic acid from the remaining aqueous layer, neutralizing the solutions containing phenol with aqueous caustic potash, separating thereform an aqueous solution of potassium and recycling the same to the initial stage.

9. The process of claim 8 in which phenol is added to the dehydrated suspension and carbon dioxide is then introduced into the suspension of the mixture of potassium phenoxide and phenol, said phenol being added in such amounts that the ratio of phenol is 0.01–10 moles per mole of the potassium phenoxide.

10. A process for the production of p-hydroxy benzoic acid which comprises suspending a reactant selected from the group consisting of potassium phenoxide and mixtures of potassium phenoxide with phenol, in a liquid hydrocarbon boiling at 180°–350° C. selected from the group consisting of kerosene, light oil and mixtures thereof, and contacting the suspension with carbon dioxide under a pressure not exceeding 30 kg./cm.$^2$ at a temperature ranging from 180° C. to 280° C., adjusting the molar ratio between dipotassium p-hydroxy benzoate to the phenol produced during the course of the reaction or initially added thereto in the resultant reaction mixture to 1:1–1:30, by adding phenol to the reaction mixture, thereby forming a liquid phase containing the phenol-potassium phenoxide mixture and a precipitate layer of potassium p-hydroxy benzoate, separating and recovering the potassium p-hydroxy benzoate from the precipitate layer, and separately recycling potassium phenoxide as the phenol-potassium phenoxide mixture in the liquid phase, said potassium phenoxide being present in an amount of 0.05 to 2 parts by weight per part by weight of the liquid hydrocarbon, and when mixtures of potassium phenoxide and phenol are used as the reactants, the molar ratio of the phenol to the potassium phenoxide being 0.01–10 moles of the phenol per mole of potassium phenoxide.

11. The process of claim 10 in which the separation of the potassium p-hydroxy benzoates from the phenol-potassium phenoxide mixture is performed at 50°–250° C.

12. A process for the production of p-hydroxy benzoic acid by reacting potassium phenoxide with carbon dioxide, which comprises suspending potassium phenoxide, together with 0.01–10 moles of phenol per mole of the potassium phenoxide, in a liquid hydrocarbon boiling at 180° C.–350° C. selected from the group consisting of kerosene, light oil and mixtures thereof, and contacting the suspension with carbon dioxide under a pressure not exceeding 30 kg./cm.$^2$, at a temperature ranging from 180° C. to 280° C., said potassium phenoxide being present in an amount of 0.05 to 2 parts by weight per part by weight of the liquid hydrocarbon.

13. A process according to claim 12 wherein the reaction is carried out at a pressure of between 3 and 15 kg./cm.$^2$.

References Cited

UNITED STATES PATENTS

| | | | |
|---|---|---|---|
| 3,405,169 | 10/1968 | Levy | 260—520 |
| 2,824,129 | 2/1958 | Nordt | 260—521 |
| 2,807,643 | 9/1957 | Hartly | 260—520 |
| 2,824,892 | 2/1958 | Barkley | 260—521 |

FOREIGN PATENTS

| | | |
|---|---|---|
| 23,174 | 11/1961 | Japan. |
| 1,617 | 2/1966 | Japan. |
| 26,612 | 11/1968 | Japan. |

OTHER REFERENCES

Hackh's "Chemical Dictionary," Blakiston Co. (1944), p. 491.

Merck Index, Merck & Co. Inc. (1960), p. 589.

LORRAINE A. WEINBERGER, Primary Examiner

J. F. TERAPANE, Assistant Examiner